United States Patent Office 3,521,578
Patented July 21, 1970

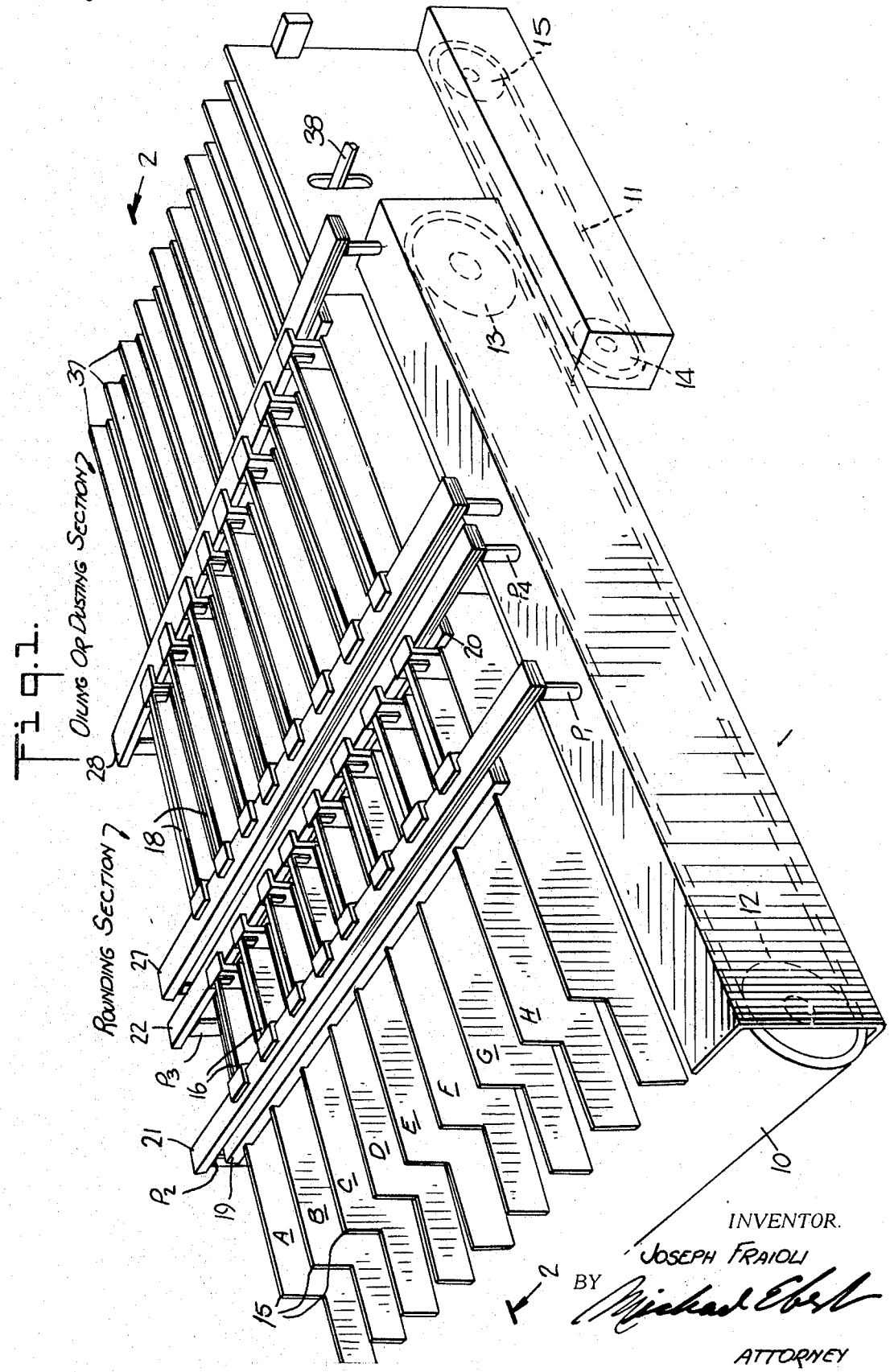

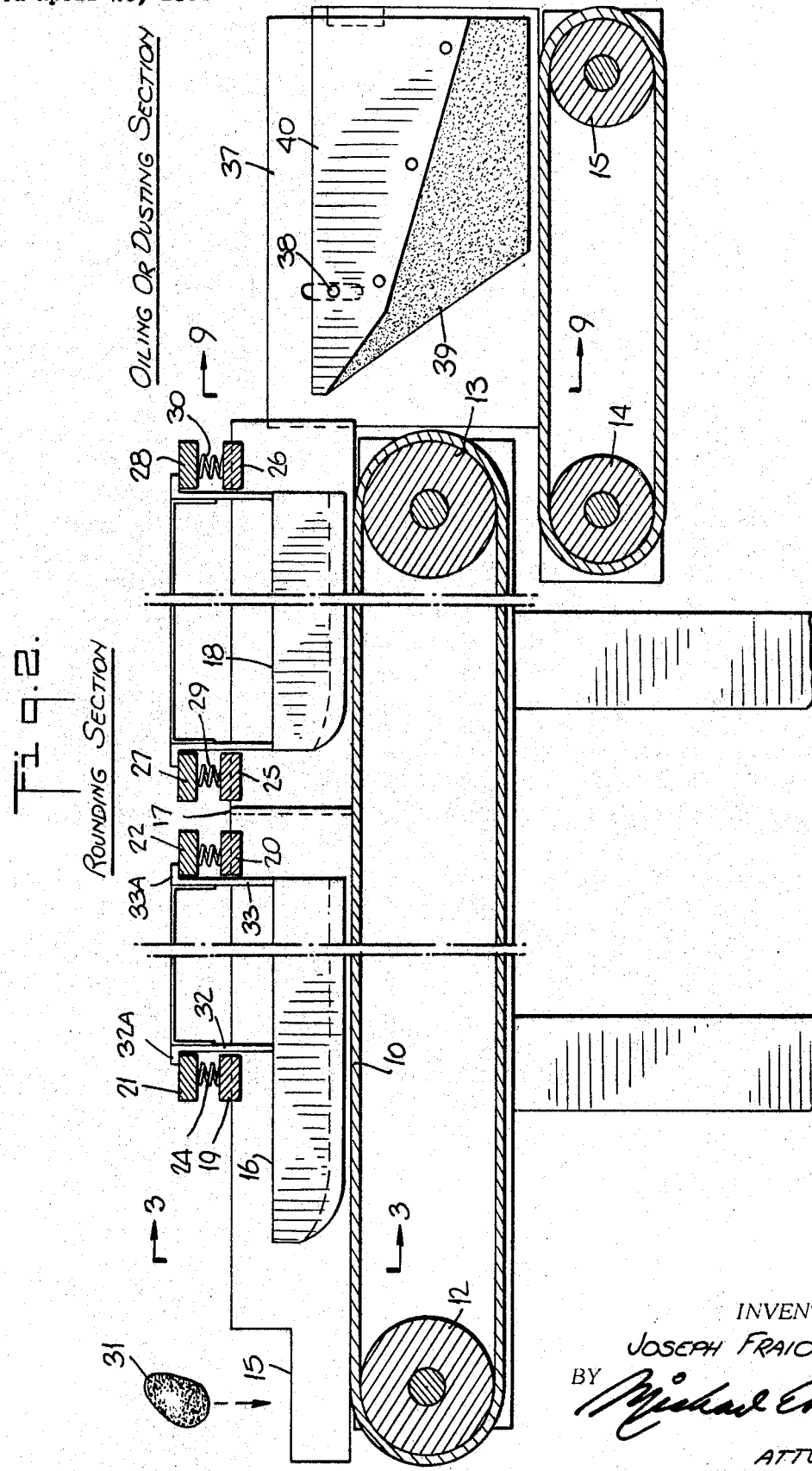

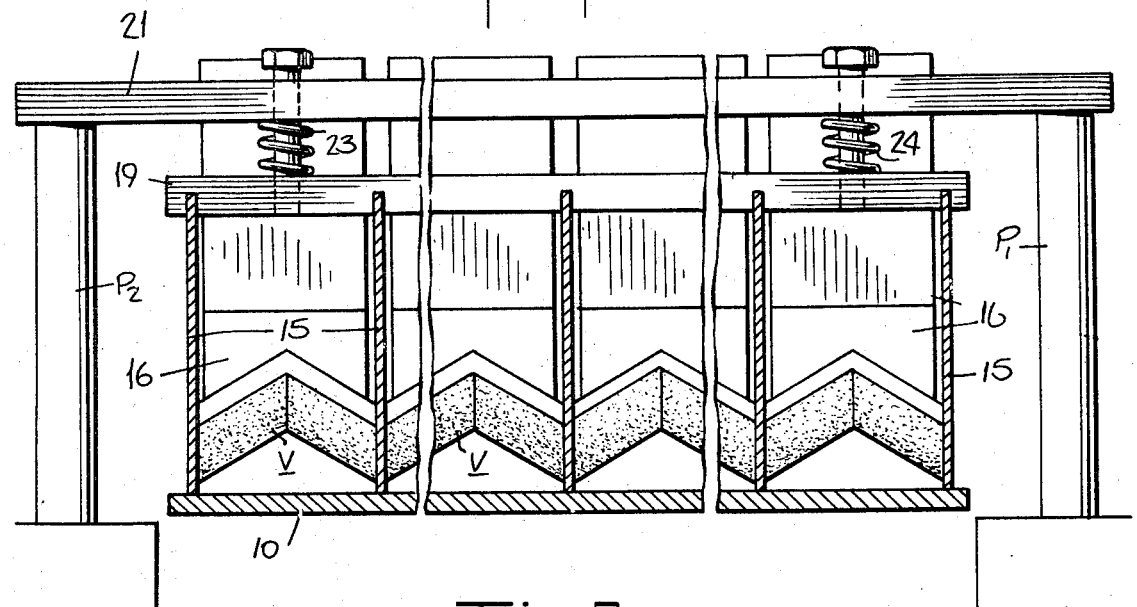
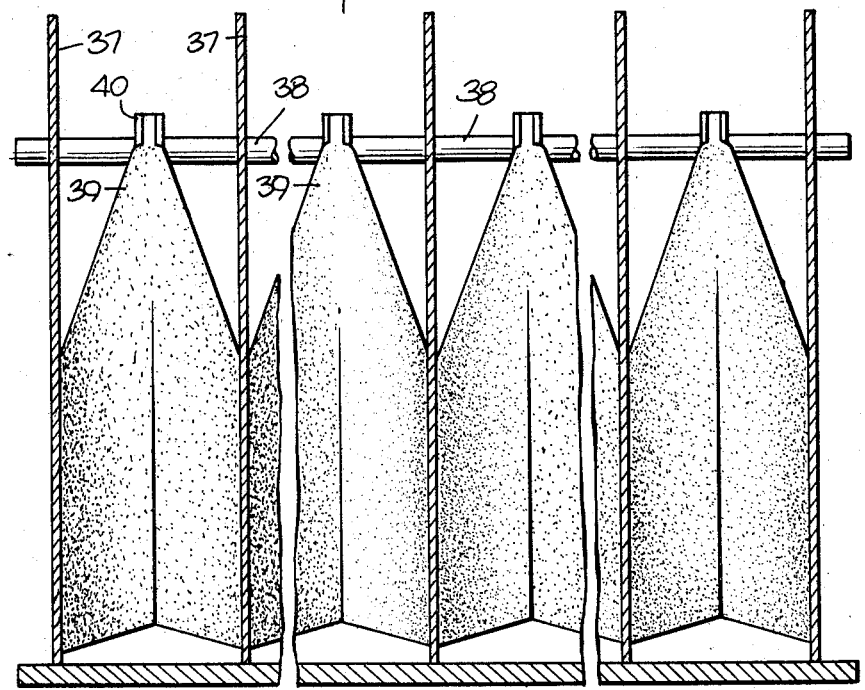

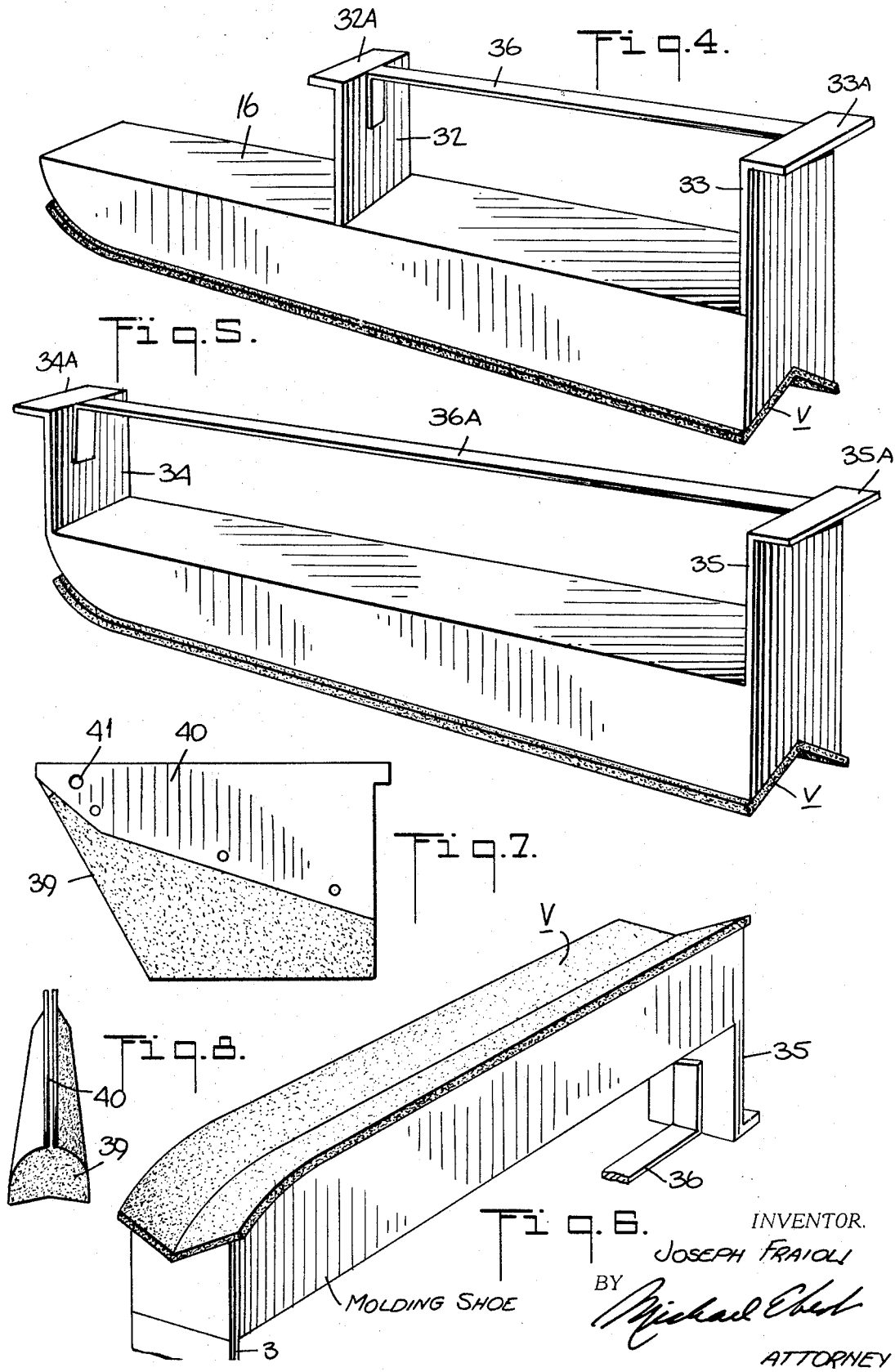

3,521,578
BAKING DOUGH ROUNDER AND MOLDING
MACHINE
Joseph Fraioli, Sr., 300 Martine Ave.,
White Plains, N.Y. 10601
Filed Apr. 26, 1968, Ser. No. 724,534
Int. Cl. A21c 11/00
U.S. Cl. 107—4
7 Claims

ABSTRACT OF THE DISCLOSURE

A dough rounder and molding machine wherein raw dough is divided into individual unshaped pieces which are deposited onto a continuous conveyor belt that transports the pieces through a bank of channels defined by parallel partitions disposed above the belt, a floating shoe having a molding surface being deposited within each channel, whereby the advancing piece engages the molding surface of the shoe and is rolled thereby to assume a round form.

---

This invention relates generally to baking machinery, and more particularly to a machine for rounding or molding unshaped pieces of raw dough and for oiling or dusting the rounded pieces.

In making rolls or similar bakery products by hand, the baker slices off from a mound of raw dough a small piece of suitable size and weight which he then lightly rolls to impart a generally round shape thereto. The rounded piece is then oiled by the baker or dusted with powder and after a suitable proofing interval to permit fermentation to take place and gas to evolve, the round piece is shaped to its ultimate form and then baked.

In recent years, such hand operations, which are time-consuming and costly, have largely been supplanted by automatic machinery in which the raw dough is mechanically sliced in a divider into individual pieces which are supplied to a rounder. In one well-known form of rounder, the unshaped pieces of dough are deposited at the outer rim of a rotating cone whose surface is grooved to prevent slippage, the piece being conveyed in a spiral path by the cone along the wall of a molding trough. In the course of such rolling movement, the trough applies pressure to the piece to form a smooth outer skin necessary to proper proofing.

In another commercial form of rolling machine, operating generally in the same way, the conveyor for the pieces takes the form of a vertical cylinder that rotates within a molding trough having a spiral configuration, the unshaped piece being admitted to the bottom of the spiral trough and being discharged from the top thereof.

In rounders of the above-described type, the individual dough pieces are sequentially introduced and rounded one at a time, hence even under high speed operations, the productive output is relatively low. For more efficient mass production, multiple rounders have been developed having an array of pockets positioned over a conveyor belt, the divider depositing a group of unshaped dough pieces into the pockets for rounding which takes place when the moving belts cause the entrapped pieces to roll within their pockets.

The disadvantage of a multiple pocket rounder of the above-described type is that the fixed dimensions of the pockets restrict the size of the dough balls which can be produced, and for the most part such rounders are limited to producing balls of 2 to 4 ounces.

Accordingly, it is the main object of this invention to provide an automatic machine for simultaneously rounding a plurality of dough pieces fed therein by a divider or other dispenser, the machine being capable of making dough balls in a large range of sizes and weights.

More specifically, it is an object of this invention to provide a rounding machine in which a group of raw dough pieces deposited onto a conveyor belt are advanced through parallel channels and are engaged therein by floating molding shoes which cause the pieces to roll and to assume a rounded shape.

A significant advantage of the invention is that the rounding action is carried out by molding shoes which are neither fixed in position or spring loaded. The shoes are arranged to float and hence are self adjusting, the shoes being capable of molding any piece of dough which the associated channel is capable of accommodating.

Also an object of the invention is to provide a rounder machine of the above type which includes a multiple channel oiling or dusting sectionally in alignment with the channels in the rounding section, whereby rounded pieces are transferred directly from the rounding section into the oiling or dusting section.

Still another object of the invention is to provide a high speed rounder machine which operates efficiently and reliably, and which may be manufactured at relatively low cost. A salient feature of the invention resides in the fact that the rounder may readily be assembled or disassembled, thereby facilitating cleaning and maintenance.

Yet another object of the invention is to provide a rounder having a conveyor belt characterized by a high coefficient of friction to prevent slippage of the pieces conveyed thereby, the surface of the belt nevertheless being of a material which is nonadhesive with respect to the pieces, thereby avoiding sticking.

Briefly stated these objects are accomplished in a dough rounder and molding machine wherein raw dough cut into individual unshaped pieces by a divider, the pieces being deposited onto a conveyor belt above which are supported parallel rails or partitions defining a bank of like channels. Disposed within each channel is a molding shoe whose longitudinal movement is restricted but which is otherwise free to float, the underside of each shoe being contoured to form a molding surface which presses against the advancing dough piece, causing the piece to roll and to assume a round shape.

For a better understanding of the invention as well as other objects and further features thereof, reference is made to the following detailed description to be read in conjunction with the accompanying drawing, wherein:

FIG. 1 is a perspective view of a bakery machine in accordance with the invention, the machine having a rounding section and an oiling or dusting section;

FIG. 2 is an elevational view of the machine, partly in section;

FIG. 3 is a transverse section taken along the plane indicated by line 3—3 in FIG. 2;

FIG. 4 is a perspective view of one of the molding shoes;

FIG. 5 is a perspective view of another of the molding shoes;

FIG. 6 shows the underside of a molding shoe, in perspective;

FIG. 7 is a side elevation of one of the oiling shoes;

FIG. 8 is a front elevation of the oiling shoe;

FIG. 9 is a transverse section taken along the plane indicated by line 9—9 in FIG. 2.

Referring now to the drawings, and more particularly to FIGS. 1, 2 and 3, a baking machine in accordance with the invention is constituted by a rounding section, including an endless conveyor belt 10, and an oiling or dusting section, including an endless conveyor belt 11. Belt 10 runs between rollers 12 and 13, while belt 11 runs between rollers 14 and 15. One of the rollers for each belt is driven to cause the belts to advance dough pieces first through the rounding section and then through the oiling or dusting section.

Mounted above conveyor belt 10 at the input end of the rounding section are a first set of guide rails or partitions 15 in spaced parallel relation which define an array of eight channels A, B, C, D, E, F, G and H, within which are disposed a group of rounding shoes 16. In alignment with partitions 15 is a second set of partitions 17 which serve to extend the channels the full length of conveyor belt 10 and disposed within the second set of partitions are a second group of rounding shoes 18.

Partitions 15 are maintained at their properly spaced vertical positions by means of a pair of transverse spacer bars 19 and 20, having slots therein to receive the upper edges of the partitions. The spacer bars are positioned below crosspieces 21 and 22 which are bridged across the belt, the pieces extending between vertical posts. Biasing springs 23 and 24 are interposed between the crosspiece 21 and the spacer bar 19 to urge the bottom edges of the partitions 15 against the belt, similar springs being placed between crosspiece 22 and spacer bar 20. To remove the partitions for cleaning or for other purposes, one has merely to unscrew the crosspieces from the posts.

Similarly, partitions 17 are maintained in their proper spaced vertical positions by means of a pair of transverse spacer bars 25 and 26 having slots therein to receive the upper edges of the partitions. These spacer bars are disposed below crosspieces 27 and 28 bridged across belt 10, the bars being biased downwardly by springs 29 and 30, respectively.

It will be seen that the front ends of partitions 15 have a cutout therein to reduce their height, and that these front ends project to the input edge of conveyor belt 10, the input being supplied by a dough divider (not shown) of any standard design adapted to deposit rough pieces of raw dough, such as piece 31, onto conveyor belt 10 and into the respective channels thereof defined by the partitions.

Shoes 16, as best seen in FIG. 4, are formed of elongated blocks provided with brackets 32 and 33, between which extends a handle 36 to facilitate the insertion of the shoes into the channel and the removal therefrom. The spacing between brackets 32 and 33, one of which is at end of the shoe and the other at an intermediate point thereon, is such as cause these brackets to lie within and against the crosspieces 21 and 22, with the flanges 32A and 33A of the bracket resting on top of the crosspieces. Thus the shoe confined within the spaced crosspieces is restricted against longitudinal movement, but is otherwise free to float in this space.

Shoes 18, as best seen in FIG. 5, are substantially the same as shoes 16 except that the brackets 34 and 35 thereof are at opposite ends of the elongated shoe block, a handle 36A extending between these brackets. The flanges 34A and 35A of the brackets of shoes 18 rest against the top of crosspieces 27 and 28 whereby longitudinal movement of the shoes is prevented, but the shoes are otherwise free to float.

The underside of both groups of shoes as best seen in FIG. 6 is contoured to provide a molding surface, this surface being in the form of a V-shaped indentation V which at the forward end of the shoe is curved upwardly to form a mouth facilitating the admission of a dough piece to be rounded.

Thus in operation, the raw pieces of dough deposited in channels A to H at the input end of conveyor belt 10 are transported thereby to engage the contoured molding passages V of the shoes 16, the shoes being forced by the advancing dough pieces to rise within their confined spaces to round the pieces within the molding passages.

As the belt continues to advance, the pieces which are now pressed down by the weight of shoes 16, are caused to roll and to be shaped by the contoured undersurface of the shoes. Since the shoes are free-floating they rise to an extent determined by the size, weight and consistency of the dough pieces being rounded thereby, and when those pieces emerge from the shoes, the shoes again drop to the level of the conveyor. The dimension of the brackets which suspend the shoes from the crosspieces is such as to bring the bottom of the shoes just above the conveyor belt but not in frictional engagement therewith, so that the shoes do not load the belt, except when dough pieces are being molded.

From the rounder section, the rounded rough pieces in the output side of conveyor belt 10 are dumped onto the belt 11 of the oiling or dusting section which is positioned at a lower level. The oiling or dusting section is divided by partitions 37 into an arry of channels which are in line with channels A to H in the rounder section.

Pivotally mounted on a shaft 38 extending transversely through a vertically elongated slot in partitions 37 are a group of oiling shoes 39. Each of these shoes, as best seen in FIGS. 7 and 8, is formed by a suitably shaped piece of resilient foam plastic material secured to a metal frame 40 having a bore 41 at the upper left corner to accommodate the shaft from which the oil shoe is pivoted.

In operation, the oiling shoe is saturated with a suitable baking oil, and as the rolled pieces are transferred from the rolling section onto belt 11 of the oiling or dusting section, the advancing pieces are engaged by the undersurface of the oiling shoes, the pieces forcing the pivoted shoes to swing upwardly. Thus the shoes press down on the rolling pieces and coat the surface thereof with oil.

In place of oiling shoes, a powder dispenser may be provided in conjunction with the oiling or dusting section, in which event the long shoes are removed. As the pieces advance through this section, they are dusted with powder before being fed into the proofing zone.

The nature of belts 10 and 11 must be such as to provide good traction to prevent slippage of the pieces when pressed down by the shoes, and yet be of a character which will not be susceptible to sticking. Thus, while one may make use of a wire mesh conveyor belt to insure good traction, the nature of the mesh is such as to entrap fragments of dough therein which are broken off in the course of transit. This not only mutilates the pieces, but requires that the belt be frequently cleaned.

In accordance with the invention, conveyor belts suitable for the rolling machine or for other types of baking machines are fabricated by coating a belt formed of wire cloth with silicone rubber. The silicone rubber solution of the proper consistency (such as GE's kTV 120) is applied to the surface of the belt in a thin layer and then permitted to cure at air temperature, several layers being successively applied. The silicone coating provides a high coefficient of friction and yet is free of any tendency to stick to the dough pieces. To increase the drag of this surface, one may roughen the applied silicone surface.

While there has been shown and described a preferred embodiment of a machine in accordance with the invention, it is to be understood that many changes and modifications may be made therein without departing from the essential spirit of the invention as defined in the annexed claims. Thus, in the rounding section, instead of eight channels as shown, one may arrange the partitions to divide the belt into four channels and place in use channel shoes adapted to produce rolls having a cylindrical rather than a somewhat spherical shape.

What I claim is:

1. A dough rounder and molding machine comprising:
   (a) a continuous conveyor belt for advancing dough pieces from an input to an output,
   (b) an array of spaced longitudinally extending partitions disposed above the belt to define a bank of like rounding channels, one for each dough piece,
   (c) a weighted molding shoe disposed within each channel, the undersurface of the shoe being contoured to impart a desired shape to the dough piece engaged thereby, and (d) means extending transversely with respect to said partitions for restricting the shoe against longitudinal movement in its associat d channel while permitting the shoe to float vertically therein, whereby the advancing dough piece engaged acts to raise the shoe within the channel and to be rolled thereby into a rounded shape.

2. A machine as set forth in claim 1, further provided with an oiling section including a second continuous conveyor belt disposed adjacent the output of the first belt, an array of spaced partitions disposed above the belt to define oiling channels in alignment with the rounding channels, and an oiling shoe pivotally mounted on each channel.

3. A machine as set forth in claim 2, wherein said oiling shoe includes a resilient foam plastic body which is saturable with baking oil.

4. A machine as set forth in claim 2, wherein the oiling shoes for the oiling channels are pivotally mounted on a common shaft which is retractable to permit removal of the oiling shoes, whereby the round pieces in the oiling channels may be dusted.

5. A machine as set forth in claim 1, wherein said spaced partitions are held in place by a pair of spacer bars engaging the upper edges thereof, said spacer bars being spring-loaded by springs interposed between said bars and a respective pair of crosspieces thereabove bridging the conveyor belt, said pairs being spaced from each other to admit said molding shoes.

6. A machine as set forth in claim 5, wherein said shoes are provided with brackets having flanges which rest on top of said crosspieces.

7. A machine as set forth in claim 1, wherein said belt is formed of wire mesh coated with a layer of silicone rubber.

References Cited

UNITED STATES PATENTS 2,750,899   6/1956   Marasso.

FOREIGN PATENTS 298,810   7/1932   Italy.
231,785   4/1959   Australia.

WALTER A. SCHEEL, Primary Examiner

R. I. SMITH, Assistant Examiner

U.S. Cl. X.R.

107—9